United States Patent
Favor et al.

(10) Patent No.: US 7,568,089 B1
(45) Date of Patent: *Jul. 28, 2009

(54) FLAG MANAGEMENT IN PROCESSORS ENABLED FOR SPECULATIVE EXECUTION OF MICRO-OPERATION TRACES

(75) Inventors: John Gregory Favor, Scotts Valley, CA (US); Seungyoon Peter Song, San Jose, CA (US); Christopher P. Nelson, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 274 days.

This patent is subject to a terminal disclaimer.

(21) Appl. No.: 11/553,458

(22) Filed: Oct. 26, 2006

Related U.S. Application Data

(60) Provisional application No. 60/730,550, filed on Oct. 26, 2005, provisional application No. 60/730,810, filed on Oct. 27, 2005, provisional application No. 60/731,962, filed on Oct. 31, 2005, provisional application No. 60/732,438, filed on Nov. 1, 2005, provisional application No. 60/832,822, filed on Jul. 23, 2006, provisional application No. 60/832,848, filed on Jul. 23, 2006, provisional application No. 60/862,609, filed on Oct. 24, 2006, provisional application No. 60/863,125, filed on Oct. 26, 2006.

(51) Int. Cl.
*G06F 9/30* (2006.01)

(52) U.S. Cl. ........................ 712/228; 712/218
(58) Field of Classification Search .......... 712/236, 712/228, 218
See application file for complete search history.

(56) References Cited

U.S. PATENT DOCUMENTS

| | | | |
|---|---|---|---|
| 4,912,707 A * | 3/1990 | Kogge et al. | 714/17 |
| 5,381,533 A | 1/1995 | Peleg et al. | |
| 5,568,380 A * | 10/1996 | Brodnax et al. | 700/79 |
| 5,632,023 A | 5/1997 | White et al. | |
| 5,649,136 A * | 7/1997 | Shen et al. | 712/244 |
| 6,018,786 A | 1/2000 | Krick et al. | |
| 6,031,992 A | 2/2000 | Cmelik et al. | |

(Continued)

OTHER PUBLICATIONS

IBM Technical Disclosure Bulletin, Grouping of Instructions, V 38, N 8, pp. 531-534, Aug. 1, 1995.*

(Continued)

*Primary Examiner*—Richard Ellis
(74) *Attorney, Agent, or Firm*—Osha • Liang LLP

(57) ABSTRACT

Managing speculative execution via groups of actions corresponding to atomic traces enables efficient processing of flag-related actions, as atomic traces advantageously enable single checkpoints of flags at trace boundaries. Flag restoration from checkpoints for trace aborts uses a flag checkpoint table to store flag checkpoints, each corresponding to an atomic trace. The table is accessed for flag restoration in response to a trace abort. In a first technique, a corresponding flag checkpoint is stored in response to trace renaming, and the flag checkpoints are updated as flags are modified. Flags are restored from the flag checkpoint corresponding to an aborted atomic trace. In a second technique, a corresponding flag checkpoint is allocated to an invalid state in response to trace renaming, and initialized on-demand when flags are first modified in accordance with the atomic trace. Flags are restored from the oldest flag checkpoint starting from an aborted atomic trace.

19 Claims, 7 Drawing Sheets

U.S. PATENT DOCUMENTS

| | | |
|---|---|---|
| 6,185,675 B1 | 2/2001 | Kranich et al. |
| 6,449,714 B1 | 9/2002 | Sinharoy |
| 6,604,060 B1 | 8/2003 | Ryan et al. |
| 2006/0179346 A1* | 8/2006 | Bishop et al. .................. 714/13 |

OTHER PUBLICATIONS

Tremblay, M., High-Performance Fault-Tolerant VLSI Systems Using Micro Rollback, Computer Science Department Technical Report CSD-910062, University of California, Los Angeles, Sep. 1991, pp. 72-74, 81, 89-90, 102-104 and 246.*

Katevenis, Emmanuel-Manolis George, Reduced Instruction Set Computer Architectures for VLSI, University of California, Berkeley, 1983, pp. 67-68 and 190.*

Almog, Y. et al., Specialized Dynamic Optimizations for High-Performance Energy-Efficient Microarchitecture, Proceedings of the International Symposium on Code Generation and Optimization, 2004 (12 pages).

Chaparro, P. et al., Distributing the Fronted for Temperature Reduction, Proceedings of the 11th Symposium on High-Performance Computer Architecture, Feb. 12-16, 2005 (10 pages).

Colwell, R.P. et al., A VLIW Architecture for a Trace Scheduling Compiler, 1987, pp. 180-192 (13 pages).

Fisher, J. A., Trace Scheduling: A Technique for Global Microcode Compaction, IEEE Transactions on Computers, vol. C-30, No. 7, Jul. 1981, pp. 478-490 (13 pages).

Friendly, D. et al, Putting the Fill Unit to Work: Dynamic Optimizations for Trace Cache Microprocessors, Proceedings of the 31st Annual ACM/IEEE International Symposium on Microarchitecture, Nov. 30-Dec. 2, 1998, pp. 173-181 (9 pages).

Grunwald, D. and Ghiasi, S., Microarchitectural Denial of Service : Insuring Microarchitectural Fairness, Proceedings of the 35th Annual IEEE/ACM International Symposium on Microarchitecture, Nov. 18-22, 2002 (10 pages).

Hinton, G. et al., The Microarchitecture of the Pentium 4 Processor, Intel Technology Journal Q1, 2001 (12 pages).

Rotenberg, E., Bennett, S., and Smith, J. E., Trace Cache: a Low Latency Approach to High Bandwidth Instruction Fetching, In Proceedings of the 29th Annual International Symposium on Microarchitecture, Dec. 2-4, 1996, Paris, France (11 pages).

Slechta, B. et al., Dynamic Optimization of Micro-Operations, Proceedings of The 9th International Symposium on High-Performance Computer Architecture, Feb. 8-12, 2003 (12 pages).

Smith, J. E. and Pleszkun, A. R., Implementation of Precise Interrupts in Pipelined Processors, Proc. Computer Architecture, 1985 (15 pages).

Vijaykumar, T. N., et al., Speculative Versioning Cache, IEEE Transaction on Parallel and Distributed Systems, vol. 12, No. 12, Dec. 2001, pp. 1305-1317 (13 pages).

* cited by examiner

FLAG MANAGEMENT IN PROCESSORS ENABLED FOR SPECULATIVE EXECUTION OF MICRO-OPERATION TRACES

CROSS REFERENCE TO RELATED APPLICATIONS

Priority benefit claims for this application are made in the accompanying Application Data Sheet (if any). To the extent permitted by the type of the instant application, this application incorporates by reference for all purposes the following application(s), which are all owned by the owner of the instant application:

U.S. Provisional Application Ser. No. 60/730,550, filed Oct. 26, 2005, first named inventor John Gregory Favor, and entitled CHECKPOINTING STATUS FLAGS FOR ATOMIC TRACES;

U.S. Provisional Application Ser. No. 60/730,810, filed Oct. 27, 2005, first named inventor John Gregory Favor, and entitled ALLOCATION AND DEALLOCATION OF SHADOW REGISTERS USED BY ATOMIC TRACES;

U.S. Provisional Application Ser. No. 60/731,962, filed Oct. 31, 2005, first named inventor John Gregory Favor, and entitled DETERMINING THE HIGHEST PRIORITY ABORT TRIGGER IN AN ATOMIC TRACE;

U.S. Provisional Application Ser. No. 60/732,438, filed Nov. 1, 2005, first named inventor John Gregory Favor, and entitled ZERO-CYCLE EXECUTION OF CLEAR OPERATION AND AUTOMATIC REGISTER FREE;

U.S. Provisional Application Ser. No. 60/862,609, filed Oct. 24, 2006, first named inventor Christopher P. Nelson, and entitled EXCEPTION HANDLING FOR ATOMIC TRACES;

U.S. Provisional Application Ser. No. 60/832,848, Jul. 23, 2006, first named inventor Don Alpert, and entitled MICROPROCESSOR WITH CACHES FOR INSTRUCTIONS, BASIC BLOCKS, AND TRACES;

U.S. Provisional Application Ser. No. 60/832,822, Jul. 23, 2006, first named inventor Don Alpert, and entitled MICROPROCESSOR WITH COHERENT CACHES FOR BASIC BLOCKS AND TRACES; and U.S. Provisional Application Ser. No. 60/863,125, Oct. 26, 2006, first named inventor Christopher P. Nelson, and entitled METHOD FOR EARLY DEALLOCATION OF PHYSICAL REGISTERS WHEN SHADOW REGISTERS ARE USED.

This application is related to the following application(s) filed simultaneously herewith, and to the extent permitted by the type of the instant application, this application incorporates by reference for all purposes the following application(s):

U.S. Non-Provisional application Ser. No. 11/553,453 entitled CHECKPOINTING FLAGS DURING ATOMIC TRACE RENAMING; and U.S. Non-Provisional application Ser. No. 11/553,455 entitled CHECKPOINTING FLAGS ON-DEMAND FOR ATOMIC TRACES.

BACKGROUND

A processor (such as a microprocessor) processes instructions according to an instruction set architecture. The processing comprises fetching, decoding, and executing the instructions. Some instruction set architectures define a programming model where fetching, decoding, executing, and any other functions for processing an instruction are apparently performed in strict order, beginning after the functions for all prior instructions have completed, and completing before any functions of a successor instruction has begun. Such an instruction set architecture provides a programming model where instructions are executed in program order.

Some processors process instructions in various combinations of overlapped (or non-overlapped), parallel (or serial), and speculative (or non-speculative) manners, for example using pipelining in functional units, superscalar issue, and out-of-order execution. Thus some processors are enabled to execute instructions and access memory in an order that differs from the program order of the programming model. Nevertheless, the processors are constrained to produce results consistent with results that would be produced by processing instructions entirely in program order.

In some instruction set architectures, instructions are characterized as being either sequential or non-sequential, i.e. specifying a change in control flow (such as a branch). Processing after a sequential instruction implicitly continues with a next instruction that is contiguous with the sequential instruction, while processing after a change in control flow instruction optionally occurs with either the contiguous next instruction or with another next instruction (frequently non-contiguous) as specified by the control flow instruction.

Some instruction set architectures define one or more conditions that are exceptions that alter the normal sequence of instructions, above and beyond sequential and non-sequential instruction control flow. Examples of exceptions comprise an interrupt for a peripheral device, an overflow for an arithmetic calculation, a protection violation for a memory access, and a breakpoint for debugging. An instruction set architecture that requires exceptions to be handled consistently with the program order provides precise exceptions. In addition to exceptions defined by the architecture, in some situations a processor processes similar events that are specific to an implementation, although transparent to the programming model. For example, a processor that predicts branches to execute instructions speculatively also handles incorrect branch predictions. A variety of techniques, such as reorder buffers and history buffers, have been applied to implement precise exceptions for processors that execute instructions in overlapped, parallel, and speculative manners. For example, see "Implementing Precise Interrupts in Pipelined Processors" by J. E. Smith and A. R. Pleszkun in IEEE Transactions on Computers, 37, 5 (May. 1988), pages 562-573.

Some instruction set architectures comprise flags that monitor conditions associated with some instructions, and the flags also control aspects of execution of some instructions. For example, an instruction performs an add operation, modifying a carry flag to indicate whether there was a carry out from the result. A subsequent instruction performs an add-with-carry operation that uses the carry flag as carry input to the addition calculation. In some instruction set architectures additional flags indicate other conditions, such as whether a calculated result is negative, zero, or positive. Some processors implement mechanisms to provide flags for an X86-compatible instruction set architecture (for example, see U.S. Pat. No. 5,632,023 issued to White et al.).

Some instruction set architectures (such as an X86-compatible architecture) comprise complex instructions. Some microprocessor implementations comprise translation hardware to convert the instructions (including complex instructions) into sequences of one or more relatively simpler operations referred to as micro-operations. Additionally, certain implementations store sequences of micro-operations that correspond to one or more instructions in a cache, such as a trace cache. For example, Intel's Pentium 4 microprocessor, as described by Hinton et al (in "The Microarchitecture Of The Pentium 4 Processor", Intel Technology Journal Q1, 2001), has a trace cache.

Furthermore, it has been proposed to optimize the micro-operations that correspond to a trace, such as by combining, reordering, or eliminating micro-operations. For example, see "Putting the Fill Unit to Work:. Dynamic Optimizations for Trace Cache Microprocessors" by Friendly at al in Proceedings of the 31st Annual ACM/IEEE international Symposium on Microarchitecture, pages 173-181. Sometimes the micro-operation optimizing blurs sequencing and boundaries of instructions along with associated status flag modifications. For example, status flag modifications may be reordered or eliminated.

All of the foregoing patents and references are hereby incorporated by reference for all purposes.

SUMMARY OF THE INVENTION

The invention, in response to complexities associated with management of flags in processors enabled for speculative execution of traces of micro-operations, provides flag restoration from checkpoints for aborts of atomic traces. In some embodiments, a method comprises managing groups of actions associated with instructions as atomic elements that are either committed entirely according to a program order or aborted entirely; managing a correspondence between the groups of actions and corresponding saved copies of speculative flags; and selectively restoring, in response to aborting one of the groups of actions, the speculative flags as a function of the saved copy of the speculative flags corresponding to the aborted group of actions; and wherein the managing the groups of actions, the managing the correspondence, and the selectively restoring occur as part of processing the groups of actions by a processor implemented within an integrated circuit and compatible with execution of the instructions.

In some embodiments, a processor comprises speculative execution control logic enabled to commit and to abort groups of actions associated with instructions as respective atomic elements in accordance with a program order between the groups of actions; flag checkpoint managing logic enabled to manage correspondences between the groups of actions and corresponding saved copies of speculative flags; and flag restoring logic enabled, in response to an abort of one of the groups of actions, to selectively restore the speculative flags as a function of the saved copy of the speculative flags corresponding to the aborted group of actions.

In some embodiments, a processor comprises means for committing and aborting atomic traces in accordance with a program order between the atomic traces; means for managing flag checkpoints enabled to manage correspondences between the atomic traces and corresponding flag checkpoints; and means for restoring speculative flags enabled, in response to an abort of one of the atomic traces, to selectively restore the speculative flags as a function of the flag checkpoint corresponding to the aborted atomic trace.

In some embodiments, a medium readable by a computer system contains descriptions that specify, when interpreted by the computer system, a circuit that comprises a speculative execution control sub-circuit enabled to direct committing and aborting groups of actions associated with instructions as respective atomic elements in accordance with a program order between the groups of actions; a flag checkpoint managing sub-circuit enabled to manage correspondences between the groups of actions and corresponding saved copies of speculative flags; and a flag restoring sub-circuit enabled, in response to an abort of one of the groups of actions, to selectively restore the speculative flags as a function of the saved copy of the speculative flags corresponding to the aborted group of actions.

The invention is optionally embodied in various embodiments, including but not limited to one or more of a process, an article of manufacture, an apparatus, a system, and a computer readable medium such as a computer readable storage medium wherein program instructions, interpretable parameters, and hardware descriptions are stored.

DETAILED DESCRIPTION OF EMBODIMENTS OF THE INVENTION

Figure 1:
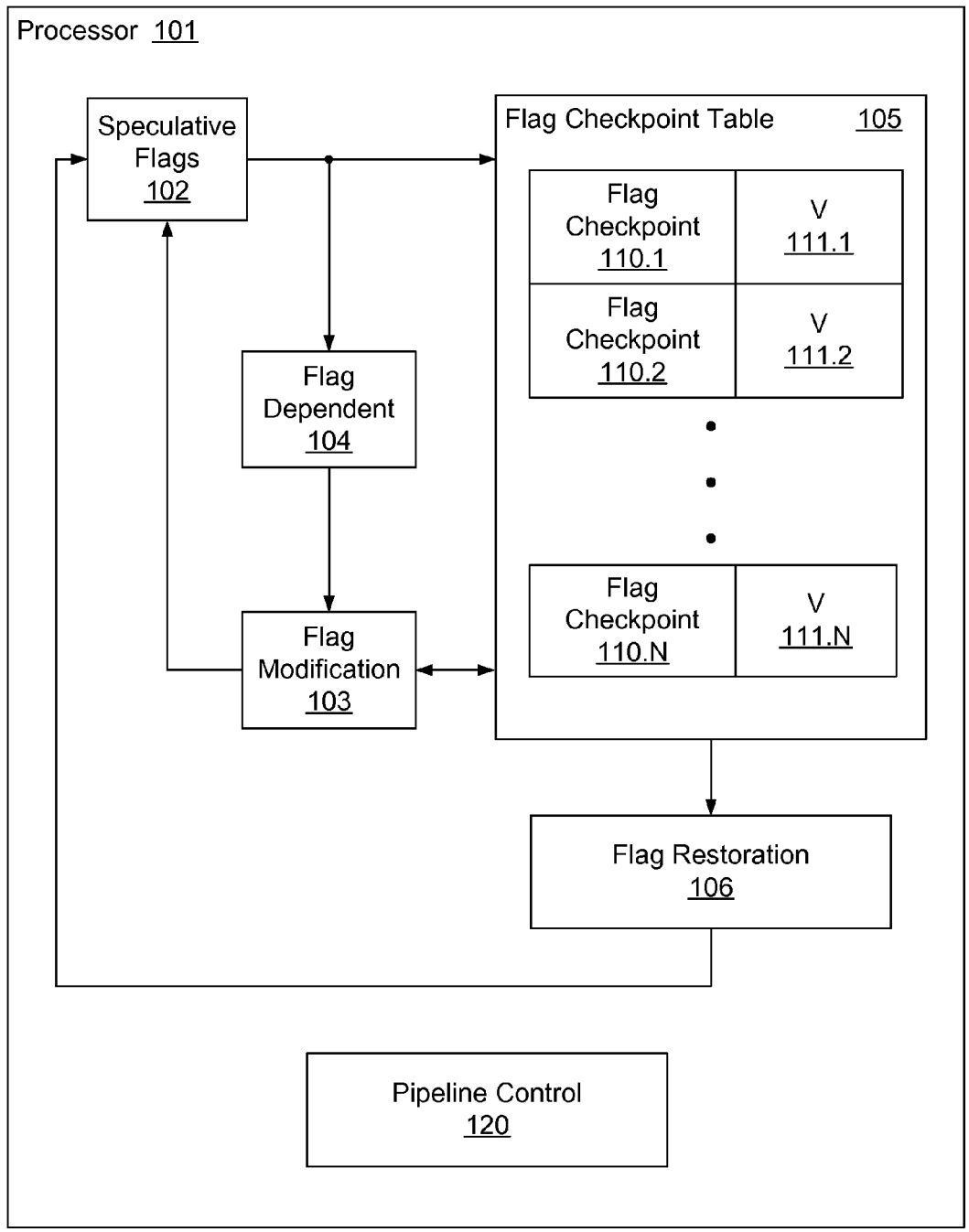
FIG. 1 illustrates selected aspects of an embodiment of the invention with a processor having checkpoint/restore of flags for atomic traces.

A detailed description of one or more embodiments of the invention is provided below along with accompanying figures illustrating selected details of the invention. The invention is described in connection with the embodiments. It is well established that it is neither necessary, practical, or possible to exhaustively describe every embodiment of the invention. Thus the embodiments herein are understood to be merely exemplary, the invention is expressly not limited to or by any or all of the embodiments herein, and the invention encompasses numerous alternatives, modifications and equivalents. To avoid monotony in the exposition, a variety of word labels (including but not limited to: first, last, certain, various, and some) may be applied to separate sets of embodiments; as used herein such labels are expressly not meant to convey quality, or any form of preference or prejudice, but merely to conveniently distinguish among the separate sets. The order of some operations of disclosed processes is alterable within the scope of the invention. Wherever multiple embodiments serve to describe variations in process, method, and/or program instruction features, other embodiments are contemplated that in accordance with a predetermined or a dynamically determined criterion perform static and/or dynamic selection of one of a plurality of modes of operation corresponding respectively to a plurality of the multiple embodiments. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. As is described in more detail in the Conclusion section, the invention encompasses all possible modifications and variations within the scope of the issued claims.

INTRODUCTION

This introduction is included only to facilitate the more rapid understanding of the Detailed Description. The invention is not limited to the concepts described in the introduction, as the paragraphs of any introduction are necessarily an abridged view of the entire subject and are not meant to be an exhaustive or restrictive description. For example, the introduction that follows provides overview information limited by space and organization to only some embodiments. There are in fact many other embodiments, including those to which claims will ultimately be drawn, that are described throughout the balance of the specification.

Terms

Elsewhere herein various terms are used with respect to descriptions of embodiments. Examples of some of the terms follow.

An example of a trace is a finite sequence of instructions or micro-operations corresponding to dynamically consecutive (according to program execution order) instructions. An example of an atomic trace is a trace that is treated, in its entirety, as a single indivisible operation or as having a single entry and a single exit (i.e. the trace is completed in full or not at all). In some embodiments atomic traces are produced by hardware translation of sequences of instructions used by software according to a reference architecture (such as the PowerPC architecture, an X86-compatible architecture, or any other similar standardized instruction processing architecture). In some usage scenarios an atomic trace may correspond to instructions from more than one basic block, i.e. have one or more interior conditional branches. As a degenerate case, an atomic trace may correspond to a single instruction. In some usage scenarios speculative execution restore points correspond to atomic trace boundaries. See FIG. 7 and the associated description for selected details of an embodiment of building atomic traces from instruction groups.

Overview

Managing speculative execution via groups of one or more actions (such as instructions, operations, or micro-operations) corresponding to atomic traces enables advantageous processing of flag-producing and flag-consuming actions. Atomic traces advantageously enable single checkpoints of flag values at atomic trace boundaries, without requiring checkpoints for individual actions within each atomic trace, even when an atomic trace has more than one action that modifies one or more flags.

Advantageous processing of speculative modifications to flags, such as in usage scenarios having atomic traces, is via speculative flags managed, in various embodiments, by any combination of checkpointing the speculative flags during renaming of the atomic traces, checkpointing the speculative flags on-demand for the atomic traces, and restoring the speculative flags from checkpoints for aborts of the atomic traces.

In a processor system, checkpointing the speculative flags of atomic traces embodies an advantageously simplified form of flag renaming. The simplified renaming is enabled in part by processing all actions producing new flag values in-order with respect to each other and all actions using flag values. Note that actions using flag values, in some embodiments, are processed out-of-order with respect to each other. A flag checkpoint table is used to store a plurality of flag checkpoints, each corresponding to an atomic trace. When an atomic trace is aborted, the table is selectively accessed to provide flag information to restore the speculative flags.

In a first technique, when an atomic trace is renamed, a corresponding flag checkpoint is stored. An action of a particular atomic trace that updates the speculative flags updates all entries in the table corresponding to atomic traces that are younger than the particular atomic trace. If the particular atomic trace is aborted, then the flag checkpoint corresponding to the particular atomic trace is used for restoring the speculative flags.

In a second technique, when an atomic trace is renamed, a corresponding flag checkpoint is allocated to an invalid state. Associated with an action of a particular atomic trace that updates the speculative flags, the particular flag checkpoint allocated to the particular atomic trace is checked for validity. If the particular flag checkpoint is invalid, then the particular flag checkpoint is initialized with the speculative flags values before any effects of the action, and marked as valid. If the check determines the particular flag checkpoint is valid, then no further processing with respect to the flag checkpoints is performed in association with the action. If an atomic trace is aborted, then the table is searched according to forward program order (i.e. from older to younger), starting with the flag checkpoint corresponding to the aborted atomic trace. The first valid flag checkpoint found is used to restore the speculative flags. If no valid flag checkpoint is found after searching through the flag checkpoint corresponding to the youngest outstanding atomic trace, then the speculative flags are correct without restoration.

In some embodiments of a processor, a plurality of flag checkpoints are stored and subsequently selectively accessed to restore speculative flags in response to an abort of a group of actions, for example in a context of speculative execution.

In some embodiments of a processor, flag checkpoints are associated with groups of actions, and when each group of actions is renamed, speculative flags are stored in the flag checkpoint associated with the renamed group of actions. When updating the speculative flags in response to one of the actions of a particular one of the groups of actions, a portion of the flag checkpoints are updated. In some embodiments, the portion corresponds to the flag checkpoints associated with the groups of actions that are younger than the particular group of actions. In some embodiments when one of the groups of actions is aborted, the flag checkpoint associated with the aborted group of actions is accessed and used to restore the speculative flags.

In some embodiments of a processor, respective flag checkpoints are allocated (as invalid) for groups of actions. When speculative flags are updated in response to an action of a particular one of the groups of actions, the particular flag checkpoint allocated to the particular group of actions is determined to be valid (or invalid). If determined invalid, then the particular flag checkpoint is updated and marked as valid. The update is with values of the speculative flags before executing any of the flag-producing actions of the particular group of actions. In some embodiments, the particular group of actions is aborted, and in response a portion of the flag checkpoints are accessed. The portion comprises the particular flag checkpoint. In some embodiments, the portion further comprises the flag checkpoint allocated to a next one of the groups of actions. In some embodiments, the next one of the groups of actions immediately follows the particular group of actions with respect to program order. In some embodiments, if the next flag checkpoint associated with the next group of actions is invalid, then the speculative flags are not affected by the abort of the particular group of actions. In some embodiments, if the particular flag checkpoint is valid, then the particular flag checkpoint is written into the speculative flags in response to the abort. In some embodiments, if the particular flag checkpoint is invalid and the next flag checkpoint is valid, then the next flag checkpoint is written into the speculative flags. In some embodiments where the groups of actions correspond to traces, the flag checkpoint allocation occurs in association with renaming the traces.

In some embodiments, the groups of actions correspond to groups of micro-operations produced by translating one or more corresponding instructions. In some embodiments, the groups of actions correspond to traces of micro-operations produced by translating one or more corresponding instructions. In some embodiments, the groups of actions correspond to an atomic trace of micro-operations produced by translating one or more corresponding instructions. In some embodiments, the groups of actions correspond to groups of instructions.

In some embodiments, the flag checkpoints are maintained in a flag checkpoint table. In some embodiments, entries of the flag checkpoint table comprise a validity bit.

In some embodiments, the flags comprise one or more control flags. According to various embodiments, the control flags comprise any combination of trap, interrupt, string direction, privilege level, nested task, resume, virtual mode, alignment check, and virtual interrupt control flags of various X86-compatible architectures. In some embodiments, the flags comprise one or more status flags. According to various embodiments, the status flags comprise any combination of carry, parity, auxiliary, zero, sign, and overflow status flags of the various X86-compatible architectures.

Processor with Flag Checkpoint/Restore

FIG. 1 illustrates selected aspects of an embodiment of checkpoint/restore of flags for atomic traces. Various embodiments of Processor 101 are enabled for any combination of overlapped/non-overlapped, parallel/serial, and speculative/non-speculative execution, as controlled, for example, by all or portions of Pipeline Control logic 120 (couplings between the Pipeline Control and other elements of FIG. 1 are omitted for clarity). In some embodiments micro-operations are built from instructions having a program order by trace building logic into atomic traces that are retained by a trace cache. The atomic traces are committed (if successful) as a group or aborted (if not successful) as a group as controlled by the Pipeline Control logic in accordance with the program order of the instructions. The Processor comprises a set of speculative or current flags shown as Speculative Flags 102 (comprising, for example, a string direction control flag and carry, zero, and parity status flags). The Speculative Flags are updated by Flag Modification logic 103. The Flag Modification logic computes new flag values (such as a carry produced by an add instruction) and also controls the Speculative Flags to store the new flag values appropriately.

The Speculative Flags are read by various elements requiring flag values as inputs to computations that depend on the flag values (such as an add-with-carry instruction), as illustrated by Flag Dependent logic 104. The Flag Dependent logic provides new flag values or speculative flag values to be used for computing new flag values, according to embodiment, to Flag Modification logic 103.

According to various embodiments, Flag Modification logic 103, and Flag Dependent logic 104, and Pipeline Control logic 120, or any portions thereof, are comprised or distributed in various combinations of one or more functional units, arithmetic logic units, and other similar computational and control modules.

Flag values to be used for restoration of architectural state to undo speculative flag modifications are stored in Flag Checkpoint Table 105. As illustrated, the Flag Checkpoint Table provides for a plurality of flag checkpoints, shown conceptually as Flag Checkpoint 110.1, Flag Checkpoint 110.2 . . . Flag Checkpoint 110.N. In some embodiments each flag checkpoint has a respective valid bit, shown conceptually as Valid Bit 111.1, Valid Bit 111.2 . . . Valid Bit 111.N. Values are provided for storage into the Flag Checkpoint Table via Speculative Flags 102 and Flag Modification logic 103. The Flag Checkpoint Table is referenced to return the Speculative Flags to a set of previous values (to undo speculation by reference to one of Flag Checkpoint 110.1, Flag Checkpoint 110.2 . . . 110.N, for example) by Flag Restoration logic 106. In various embodiments various portions of the Flag Checkpoint Table are comprised in a regular structure such as a storage array. In some embodiments the Valid Bits are comprised in random logic not part of the regular structure.

In various embodiments the Flag Checkpoint Table is enabled to retain checkpoint information relating to other architectural state and/or micro-architectural state in addition to copies of speculative flags. For example, in some embodiments a program counter or instruction pointer is retained per flag checkpoint in the Flag Checkpoint Table.

In some embodiments the flags are used (i.e. consumed) and modified (i.e. produced) strictly in order, and Speculative Flags 102 implements only a single copy of the flags. In some embodiments the flags are used and modified in-order inside each atomic trace, but processed in parallel or out-of-order with respect to several outstanding atomic traces, and there is a copy of the flags associated with each of the outstanding atomic traces.

Speculative Flags 102 may be implemented as a set of storage elements (such as flip-flops) and holds the speculative value of the flags as needed by speculatively executing code. In some embodiments the storage elements are arranged as a collection of fields of varying width (such as a single bit or a plurality of bits) that are individually modifiable and readable. Individually modifiable fields enable straight-forward merging of one or more newly produced flag values with one or more previously produced flag values, such as in embodiments where flag modifications are made according to original program order of instructions. For example, a micro-operation corresponding to an instruction that modifies the zero and parity status flags, but leaves the carry status flag unchanged (such as an X86-compatible decrement instruction) modifies the zero and parity fields, and leaves unchanged the string direction and carry fields. Instructions using flags are executed in part by using flag values read from Speculative Flags 102 (such as referring to outputs of the flip-flops).

According to various embodiments various combinations of all or portions of functions performed by Speculative Flags 102, Flag Modification logic 103, Flag Dependent logic 104, Flag Restoration logic 106, and Pipeline Control logic 120 are specified by descriptions compatible with processing by a computer system (e.g. Verilog, VHDL, or any similar hardware description language). In some embodiments the processing comprises any combination of interpretation, compilation, and synthesis to produce or specify logic suitable for inclusion on an integrated circuit.

Flag Checkpoint/Restore Operation

A first technique for checkpoint/restore of flags with respect to atomic traces comprises storing a checkpoint of the speculative flags for each atomic trace. Each respective checkpoint corresponds to proper architectural flag state prior to executing the respective atomic trace. When each atomic trace is first renamed (i.e. presented for possible execution), the speculative flag values are written into a corresponding checkpoint. The values written may not be correct (yet), as prior micro-operations may not have completed, leaving some outstanding flag updates still to be processed.

Micro-operations that update one or more flags record new values in the speculative flags and also modify all flag checkpoints (in the flag checkpoint table) for all younger (i.e. corresponding to instructions "in the future" with respect to program order) atomic traces. If there are no atomic traces started beyond the one currently executing (i.e. including the micro-operation updating the flags), then no flag checkpoint table writes occur. If there are additional one or more atomic traces started beyond the atomic trace currently executing, then updated flags are written to each of flag checkpoints corresponding to the started traces. Thus with respect to a first atomic trace immediately followed in program order by a second atomic trace, after all flag updates for the first atomic trace have been processed, flag checkpoint information corresponding to the second atomic trace is guaranteed to be completely up to date (i.e. any outstanding flag updates will have been processed). Note that if the first atomic trace has no flag updates, then the checkpoint values for the second atomic trace are identical to the checkpoint values of the first atomic trace.

If an atomic trace is aborted (i.e. micro-operations performed in response to the atomic trace are undone), then the flag checkpoint associated with the aborted trace is read out and written into the speculative flags. As long as all earlier atomic traces (with respect to the trace being aborted) have completed any associated flag updates (including writing appropriate flag checkpoints), then the flag checkpoint associated with the aborted trace has the correct architectural state to restore the flags in response to the abort.

Figure 2:
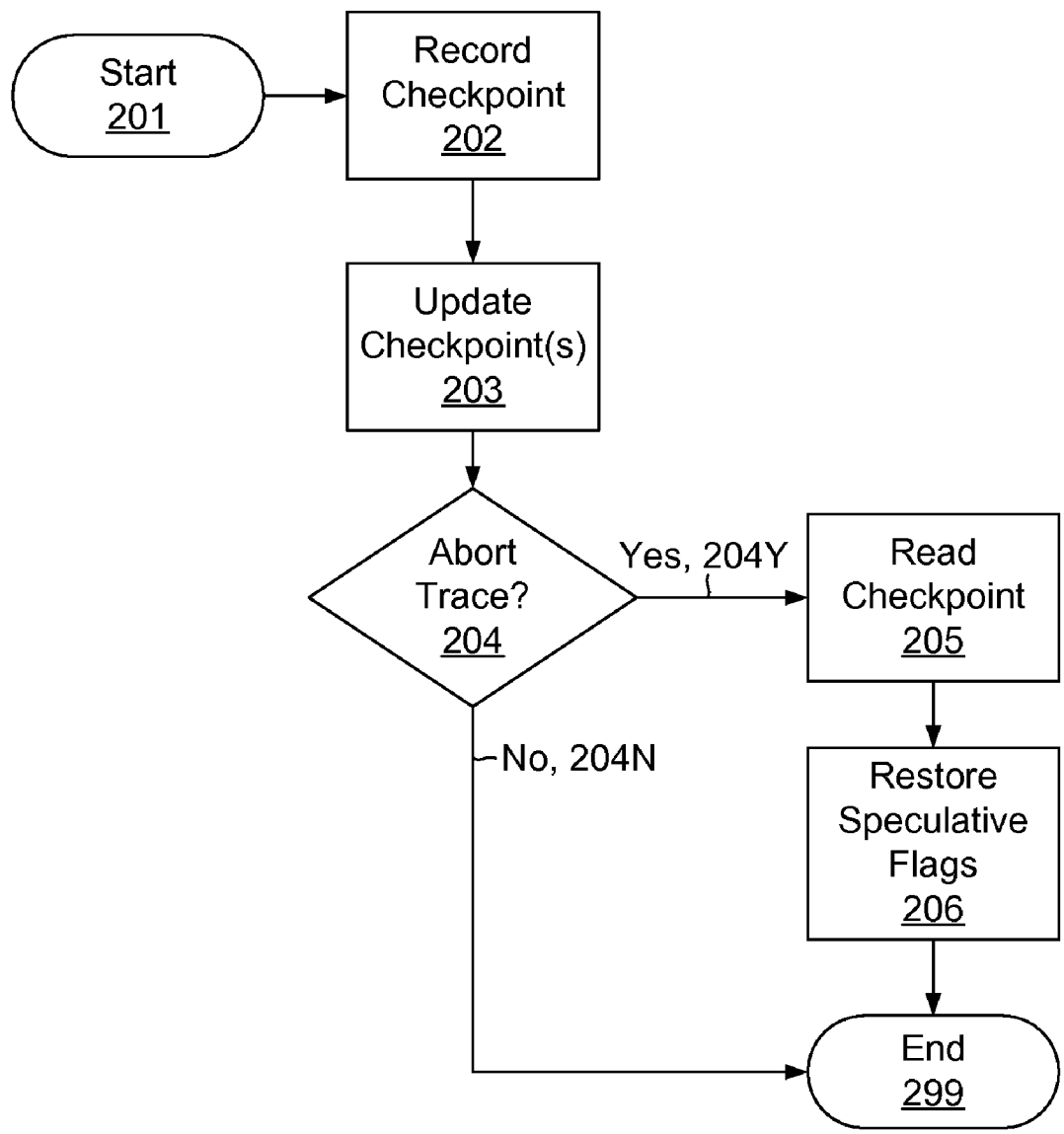
FIG. 2 illustrates selected aspects of an embodiment of the invention using a first technique for checkpoint/restore of flags with respect to atomic traces.

FIG. 2 illustrates selected aspects of an embodiment of the first technique for checkpoint/restore of flags with respect to atomic traces. The figure is representative of processing relating to one atomic trace and a corresponding flag checkpoint. A plurality of atomic traces (and corresponding flag checkpoints) may be processed according to the figure wholly or partially in parallel, or a sequence of atomic traces (and corresponding flag checkpoints) may be processed substantially in series, according to the figure. Thus micro-operations in the figure may be performed for a single trace or for a plurality of traces in various relatively overlapping or non-overlapping manners according to various embodiments and various pipeline conditions.

An atomic trace is renamed and flow begins ("Start" 201). Flow then continues to save a copy of Speculative Flags 102 (see FIG. 1) as a checkpoint in Flag Checkpoint Table 105 ("Record Checkpoint" 202). For an example atomic trace, the checkpoint is saved in Flag Checkpoint 110.1. Flag modifications, such as produced by Flag Modification logic 103, and generated by micro-operations relating to atomic traces that are older than the renamed atomic trace then update Speculative Flags 102 and also update checkpoints in Flag Checkpoint Table 105 for relatively younger atomic traces ("Update Checkpoint(s)" 203). According to the example, Flag Checkpoint 110.1 is updated, along with any other younger flag checkpoints. In some usage scenarios an atomic trace has more than one flag-producing micro-operation, and thus "Update Checkpoint(s)" 203, is performed repeatedly, once for each flag-producing micro-operation in each older trace.

After at least all atomic traces that are older than the renamed atomic trace are processed (and thus all outstanding flag modifications have been recognized and recorded in any associated flag checkpoints), a determination is made as to whether the renamed atomic trace may be allowed to complete normally or whether micro-operations associated with it are to be unwound ("Abort Trace?" 204). If the trace requires no abort processing ("No" 204N), then processing relating to the trace and any possible flag checkpoint/restore micro-operations is complete ("End" 299). Storage used by saving the copy of the Speculative Flags as a checkpoint is then free. Note that in some embodiments and/or usage scenarios the determination is further conditional upon completion of one or more or all micro-operations in the renamed trace.

If the trace does require abort processing ("Yes" 204Y), then the flag checkpoint corresponding to the aborted atomic trace is read from Flag Checkpoint Table 105 ("Read Checkpoint" 205). According to the example, Flag Checkpoint 110.1 is read. The flag checkpoint read is used to update flag architectural state to a proper value by writing the flag checkpoint read value into the Speculative Flags ("Restore Speculative Flags" 206). Reading Flag Checkpoint Table 105 and restoring Speculative Flags 102 are performed via Flag Restoration logic 106. Processing of the renamed atomic trace is then complete ("End" 299). Storage used by saving the copy of the Speculative Flags as a checkpoint is then free. Note that the first technique does not require valid bits in flag checkpoints (such as V 111.1).

Figure 5:
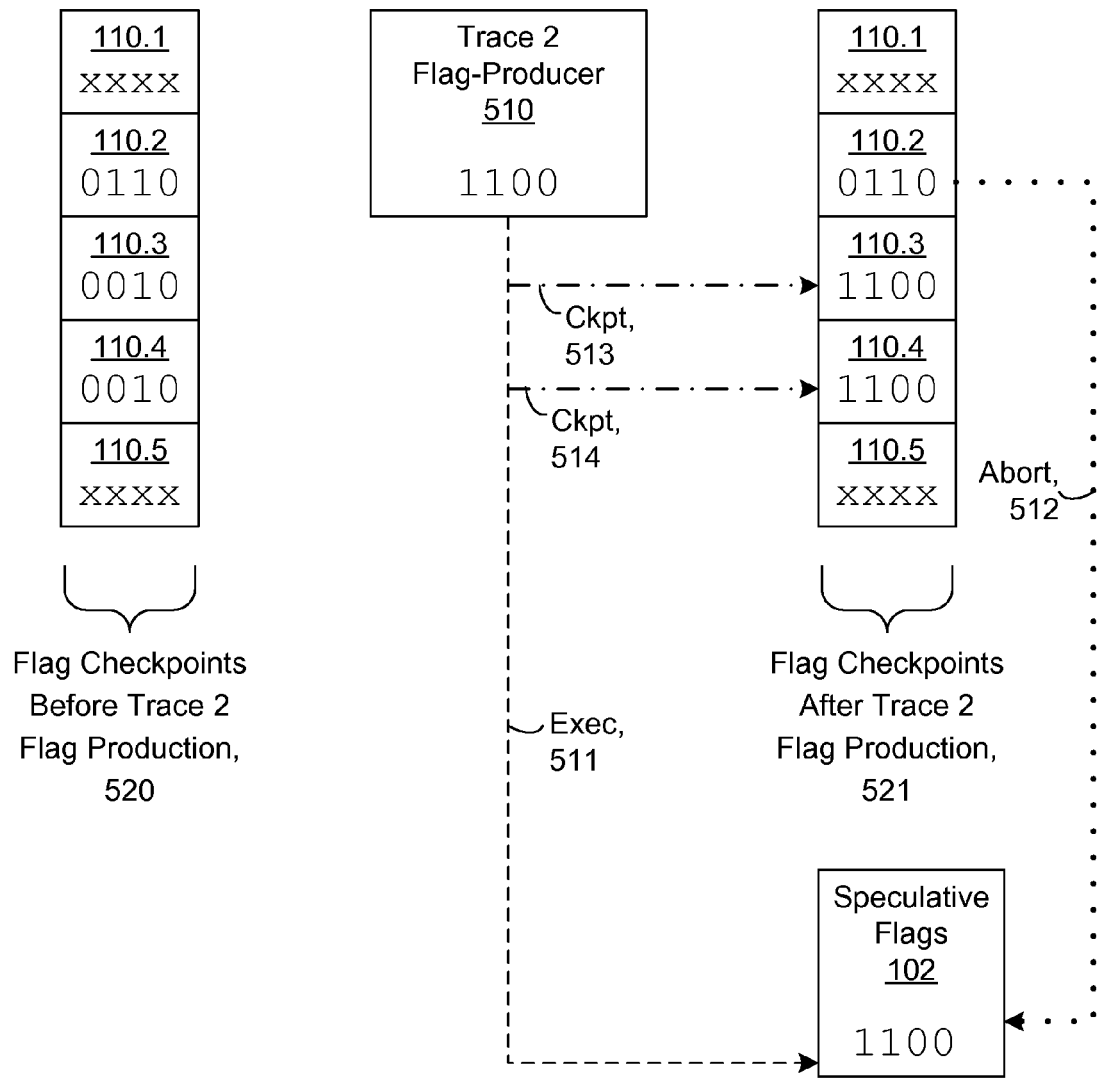
FIG. 5 illustrates an example of operation of an embodiment of the invention in accordance with the first technique for checkpoint/restore of flags with respect to atomic traces.

See FIG. 5 and the associated description for a more detailed example of operation of an embodiment according to the first technique for checkpoint/restore of flags with respect to atomic traces.

A second technique for checkpoint/restore of flags with respect to atomic traces comprises allocating (or setting aside) storage for a flag checkpoint in the flag checkpoint table for each atomic trace prior to execution of each atomic trace. One flag checkpoint is allocated for each atomic trace. When each atomic trace is first renamed, the valid bit for the allocated flag checkpoint is set to "invalid" (having an encoding such as 0), thus marking the checkpoint as invalid.

A micro-operation of a particular atomic trace that updates one or more of the flags checks the valid bit of the particular flag checkpoint allocated to the particular atomic trace. If the particular flag checkpoint is invalid, then values of the speculative flags prior to execution of the micro-operation are saved in the allocated flag checkpoint, and the valid bit is set to "valid" (having an encoding such as 1), marking the checkpoint as valid. Thus compared to the first technique, the second technique copies flag values prior to modification by an active atomic trace, and records the copied values in the flag checkpoint allocated for the active atomic trace, rather than into checkpoints associated with atomic traces younger (with respect to program order) than the active atomic trace. If an atomic trace comprises any flag-modifying micro-operations, then the associated allocated flag checkpoint contains a valid copy of the flags prior to execution of the atomic trace. If an atomic trace is free of any flag-modifying micro-operations, then the valid bit of the associated allocated flag checkpoint remains invalid.

If an atomic trace is aborted and the specific flag checkpoint allocated to the aborted atomic trace is marked valid, then the specific flag checkpoint is read out and written into the speculative flags. If the specific flag checkpoint is invalid when the atomic trace is aborted, then a search is made for a valid flag checkpoint associated with an atomic trace that is younger in the program order (i.e. having a checkpoint allocated later) than the aborted atomic trace. The searching is performed starting with the atomic trace (if any) that immediately follows the aborted atomic trace, and proceeds forward in program order examining the flag checkpoints allocated to every outstanding younger atomic trace. If a younger valid flag checkpoint is found, then the younger valid flag checkpoint is read out and written into the speculative flags. If no younger valid flag checkpoints are located, then no restoration is needed, as the speculative flags represent correct architectural state, i.e. there have been no further flag modifications with respect to the aborted atomic trace. In some usage scenarios, the second technique performs less work (and thus consumes less power) than the first technique when there are no atomic trace aborts, at the expense of additional work (and thus greater power consumption) when there is an atomic trace abort.

Figure 3:
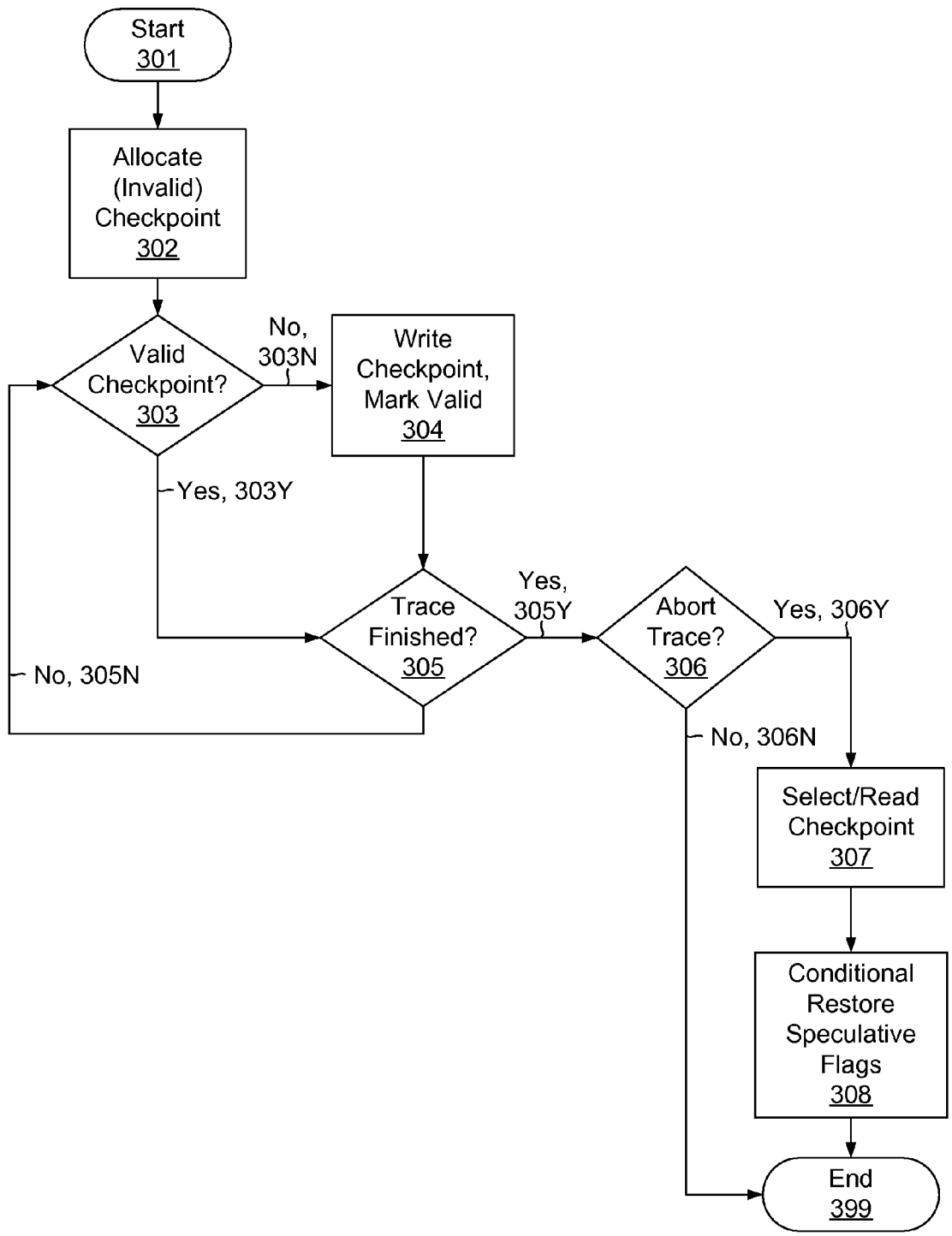
FIG. 3 illustrates selected aspects of an embodiment of the invention using a second technique for checkpoint/restore of flags with respect to atomic traces.

FIG. 3 illustrates selected aspects of an embodiment of the second technique for checkpoint/restore of flags with respect to atomic traces. As in FIG. 2, FIG. 3 is representative of processing relating to one atomic trace, and a plurality of atomic traces may be processed according to the figure wholly or partially in parallel, or a sequence of atomic traces may be processed substantially in series, according to the figure. Thus micro-operations in the figure may be performed for a single trace or for a plurality of traces in various relatively overlapping or non-overlapping manners according to various embodiments and various pipeline conditions.

An atomic trace is renamed and flow begins ("Start" 301). Flow then continues by setting aside an entry in Flag Checkpoint Table 105 (see FIG. 1), marking the entry as invalid by writing the valid bit associated with the entry ("Allocate (Invalid) Checkpoint" 302). For an example atomic trace, the allocated checkpoint is Flag Checkpoint 110.1, and the associated validity marker Valid Bit 111.1 is written (e.g. to 0).

Flag modifications, such as produced by Flag Modification logic 103, and generated by one or more flag-producing micro-operations relating to the renamed atomic trace, are processed. Then a determination is made as to if the allocated flag checkpoint is valid ("Valid Checkpoint?" 303). If the checkpoint is invalid ("No" 303N), then processing proceeds to record flag information in the entry and mark the entry valid ("Write Checkpoint, Mark Valid" 304). In the example atomic trace, Valid Bit 111.1 is checked and if it is invalid, then Flag Checkpoint 110.1 is written and marked valid by writing Valid Bit 111.1 (e.g. to 1). The values written in the flag checkpoint correspond to values of Speculative Flags 102 (of FIG. 1) prior to any flag modifications made by the renamed atomic trace. Processing relating to checking the valid bits and conditionally writing flag information along with marking the written information valid is performed by various combinations of Flag Modification logic 103 and Flag Checkpoint Table 105, according to various embodiments. After modifying the flag checkpoint, flow proceeds to determine if micro-operations to be performed by the renamed trace are complete ("Trace Finished?" 305).

If the checkpoint is (already) valid ("Yes" 303Y), then flow proceeds directly to determine if micro-operations to be performed by the renamed trace are complete ("Trace Finished?" 305), i.e. no modifications are made to information in Flag Checkpoint Table 105. If the trace is not yet completely processed, i.e. has any outstanding micro-operations to perform ("No" 305N), then flow proceeds back to process further flag modifications that may result while performing the outstanding micro-operations associated with the trace (via "Valid Checkpoint?" 303).

If the renamed trace has completed processing ("Yes" 305Y), then flow proceeds to determine if the trace may be allowed to complete normally or whether micro-operations associated with it are to be unwound ("Abort Trace?" 306). If the trace requires no abort processing ("No" 306N), then processing relating to the trace and any possible flag checkpoint/restore micro-operations is complete ("End" 399). If the trace does require abort processing ("Yes" 306Y), then a selected flag checkpoint appropriate for processing the abort is conditionally read from Flag Checkpoint Table 105 ("Select/Read Checkpoint" 307) and conditionally written into Speculative Flags 102 ("Conditional Restore Speculative Flags" 308) under control of Flag Restoration logic 106. Processing of the renamed atomic trace is then complete ("End" 399).

As a special case, if there are no flag-producing micro-operations relating to the renamed atomic trace, then the allocated flag checkpoint determination ("Valid Checkpoint?" 303) operates as if the checkpoint is valid ("Yes" 303Y), even though the checkpoint is not valid, and flow proceeds directly to determine if micro-operations to be performed by the renamed trace are complete ("Trace Finished?" 305). Flow loops back to repeat the determinations ("Valid Checkpoint?" 303 and "Trace Finished?" 305) until the micro-operations of the renamed trace are complete.

In various embodiments, the allocating and the searching are in accordance with a head pointer, a tail pointer, or both that identify appropriate Flag Checkpoints in the Flag Checkpoint Table. The head pointer identifies the flag checkpoint allocated to the oldest outstanding atomic trace, and the tail pointer identifies the flag checkpoint allocated to the youngest atomic trace. Associated with the allocating, the tail pointer is advanced to point to the next allocated flag checkpoint. When the tail pointer is "adjacent to" the head pointer, then further allocation is held until one or more flag checkpoints are freed. Associated with committing an atomic trace, the head pointer is advanced to point to the flag checkpoint allocated to the oldest still outstanding atomic trace after the committing. Associated with the searching, the tail pointer identifies the last flag checkpoint to examine for validity. In some embodiments having a head pointer and lacking a tail pointer, as an atomic trace is committed, the corresponding flag checkpoint is invalidated. Associated with the searching, the flag checkpoint adjacent to the flag checkpoint identified by the head pointer is the last flag checkpoint to examine for validity.

Figure 6:
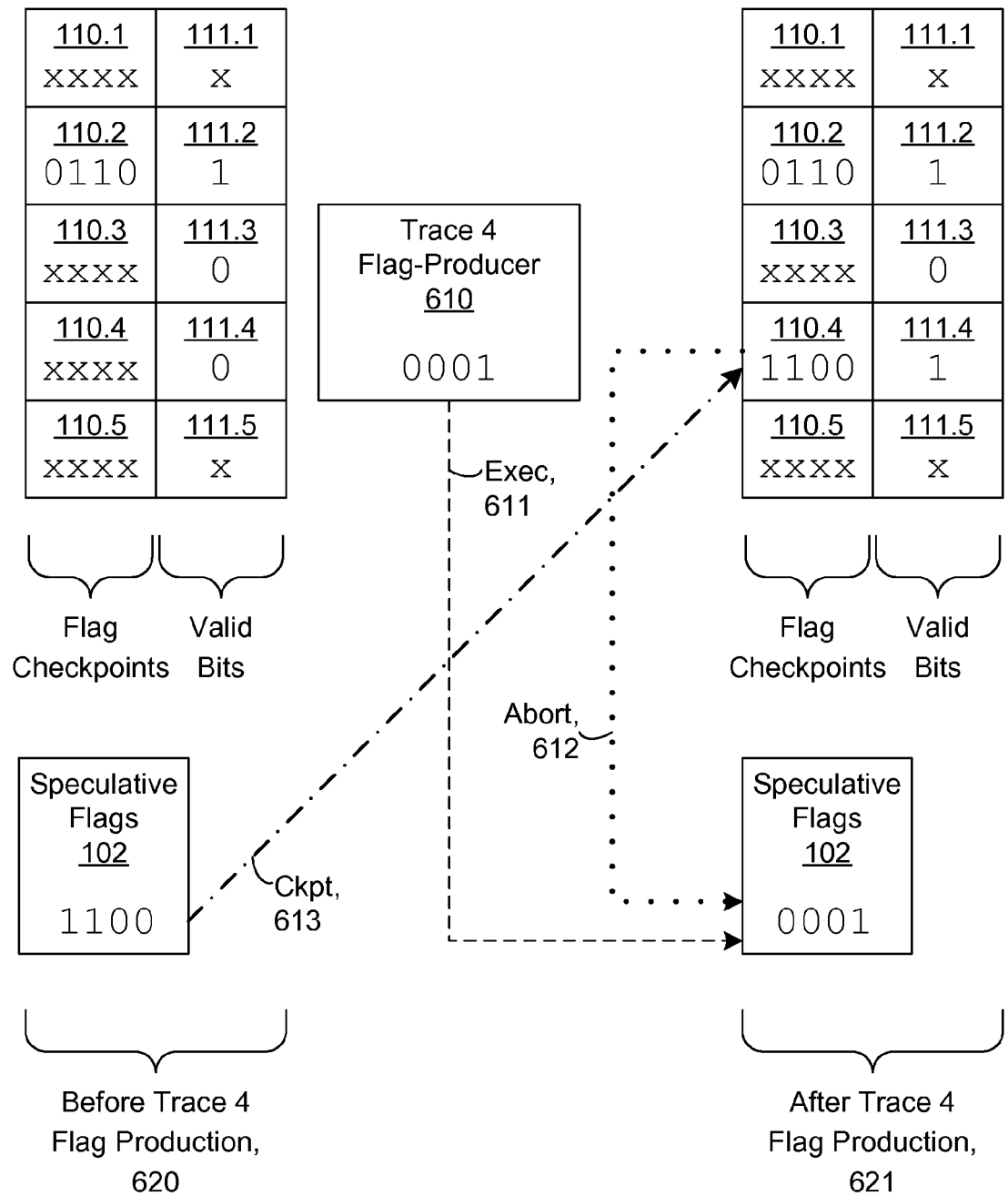
FIG. 6 illustrates an example of operation of an embodiment of the invention in accordance with the second technique for checkpoint/restore of flags with respect to atomic traces.

See FIG. 6 and the associated description for an example of operation of an embodiment according to the second technique for checkpoint/restore of flags with respect to atomic traces.

Figure 4:
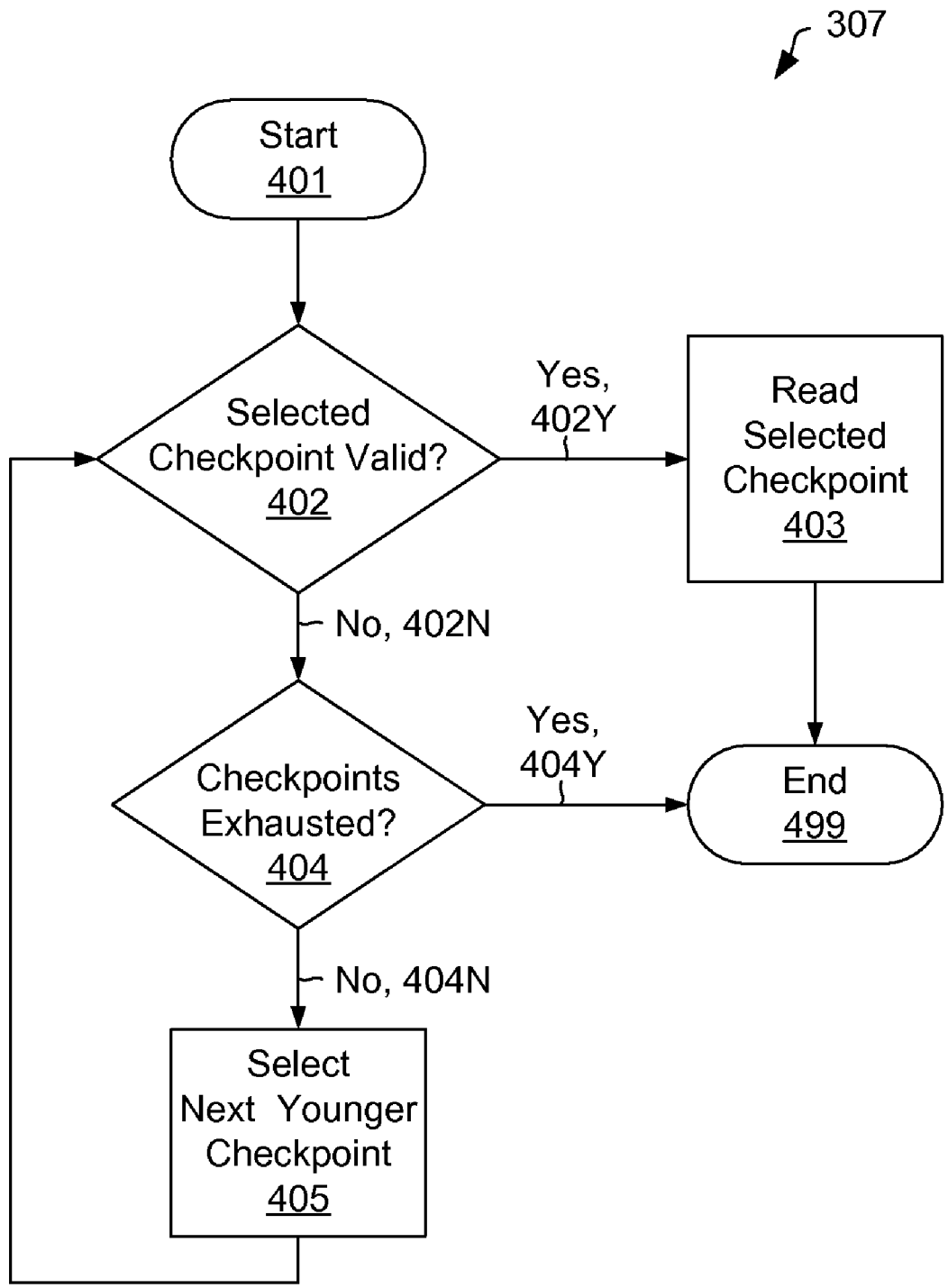
FIG. 4 illustrates selected aspects of an embodiment of the invention relating to selected portions of processing associated with selecting and reading of an appropriate flag checkpoint.

FIG. 4 illustrates an embodiment of selected portions of processing associated with selecting and reading of an appropriate flag checkpoint (such as performed in "Select/Read Checkpoint" 307). The objective of the processing is to read the oldest (if any) valid flag checkpoint, searching from an aborted atomic trace forward in program order (i.e. from older to younger) until all flag checkpoints corresponding to all outstanding atomic traces are searched. If no valid flag checkpoint is found, then Speculative Flags 102 are already correct (i.e. no restoration is performed).

Processing starts from a selected checkpoint (such as one of Flag Checkpoint 110.1, Flag Checkpoint 110.2 . . . Flag Checkpoint 110.N of FIG. 1) that corresponds to a trace to be aborted ("Start" 401). Flow then proceeds to determine if the selected checkpoint has been written with proper flag state ("Selected Checkpoint Valid?" 402). If so ("Yes" 402Y), then the oldest valid checkpoint (searching forward) has been located and is used to restore the architectural state of the Speculative Flags. Flow then proceeds to access the selected checkpoint ("Read Selected Checkpoint" 403) and processing is complete ("End" 499).

If the selected checkpoint is not valid ("No" 402N), then flow proceeds to determine if all of the remaining (younger) checkpoints have been examined ("Checkpoints Exhausted?" 404). If so ("Yes" 404Y), then processing is complete ("End" 499) without having found a flag checkpoint to use to restore the Speculative Flags. Thus the Speculative Flags are already correct and need no rollback associated with the atomic trace abort. If the checkpoints are not all examined ("No" 404N), then flow proceeds to select the immediately next (in program order) flag checkpoint ("Select Next Younger Checkpoint" 405). Flow then loops back to check if the next selected checkpoint is valid ("Selected Checkpoint Valid?" 402) and continues accordingly.

Continuing with the example atomic trace, assume that the example atomic trace is the older of a pair of atomic traces that are adjacent to each other with respect to program order, i.e. there are no intervening instructions or atomic traces between the older and younger atomic traces of the pair. Further assume that the younger atomic trace is allocated Flag Checkpoint 110.2 and associated Valid Bit 111.2.

If, at the time of processing the atomic trace abort, Valid Bit 111.1 is valid (i.e. a micro-operation in the aborted trace has updated the flags), then Flag Checkpoint 110.1 is read out and used to restore the speculative flags. If Valid Bit 111.1 is invalid, then Valid Bit 111.2 is examined. If Valid Bit 111.2 is valid (i.e. a micro-operation in the younger trace has updated the flags), then Flag Checkpoint 110.2 is read out and used to restore the speculative flags. If Valid Bit 111.2 is invalid, then there have been no flag modifications, and the Speculative Flags values are correct without restoration.

OPERATIONAL EXAMPLES

FIG. 5 illustrates an example of operation of an embodiment according to the first technique for checkpoint/restore of flags with respect to atomic traces. "Flag Checkpoints Before Trace 2 Flag Production" 520 illustrates exemplary information retained in various Flag Checkpoints 110.1-110.5 (as embodied in Flag Checkpoint Table 105 of FIG. 1) before changes to the flags have been produced by processing relating to "Trace 2 Flag-Producer" 510. "Flag Checkpoints After Trace 2 Flag Production" 521 illustrates exemplary information retained in Flag Checkpoints 110.1-110.5 after changes to the flags have been produced by processing relating to "Trace 2 Flag-Producer" 510.

More specifically, before processing relating to "Trace 2 Flag-Producer" 510, the flag checkpoints corresponding to Traces 1-5 (Flag Checkpoints 110.1-110.5, respectively) contain values 'xxxx', '0110', '0010', '0010', and 'xxxx', respectively. Note that each flag checkpoint in the illustrated example operation is comprised of four single-bit flags, such as a string direction control flag, a carry status flag, a zero status flag, and a parity status flag. Thus Flag Checkpoint 110.1 (corresponding to Trace 1) stores no values of importance in the example (i.e. Flag Checkpoint 110.1 is unused), while Flag Checkpoint 110.2 (corresponding to Trace 2) stores values of 0, 1, 1, and 0, respectively for the string direction, carry, zero and parity flags. In the illustrated example, the Trace 2 Flag Checkpoint has been written previously during renaming of Trace 2 (e.g. as in "Record Checkpoint" 202 of FIG. 2). Note that in other usage scenarios the Trace 2 Flag Checkpoint would have been modified by one or more flag checkpoint updates due to processing of flag-producing micro-operations of traces older than Trace 2 subsequent to the renaming of Trace 2.

Execution of "Trace 2 Flag-Producer" 510 (e.g. by Flag Modification logic 103 of FIG. 1) updates Speculative Flags 102 (of FIG. 1) with values '1100', as illustrated conceptually by dashed-arrow Exec 511. Execution of the Trace 2 flag-producer micro-operation also results in updates to flag checkpoints corresponding to all traces younger than Trace 2 (e.g. as in "Update Checkpoint(s)" 203 of FIG. 2). The updates to younger trace flag checkpoints are illustrated conceptually by dashed-arrows Ckpts 513-514, respectively, to Flag Checkpoints 110.3-4 (corresponding to Traces 3 and 4). Note that "Trace 2 Flag-Producer" 510 is representative of one or more updates to the Speculative Flags and younger Flag Checkpoints, corresponding to one or more flag-producing micro-operations in Trace 2. If Trace 2 is aborted, then the Speculative Flags are restored from Flag Checkpoint 110.2 (corresponding to Trace 2), as illustrated conceptually by dotted-arrow Abort 512 (e.g. as in "Read Checkpoint" 205 and "Restore Speculative Flags" 206 of FIG. 2).

FIG. 6 illustrates an example of operation of an embodiment according to the second technique for checkpoint/restore of flags with respect to atomic traces. "Before Trace 4 Flag Production" 620 illustrates exemplary information retained in Speculative Flags 102 (of FIG. 1) and in various Flag Checkpoints 110.1-110.5 and associated Validity Bits 111.1-111.5 (as embodied in Flag Checkpoint Table 105 of FIG. 1) before changes to the flags have been produced by processing relating to "Trace 4 Flag-Producer" 610. "After Trace 4 Flag Production" 621 illustrates exemplary information retained in Speculative Flags 102 and Flag Checkpoints 110.1-110.5 and associated Validity Bits 111.1-111.5 after changes to the flags have been produced by processing relating to "Trace 4 Flag-Producer" 610.

More specifically, before processing relating to "Trace 4 Flag-Producer" 610, the flag checkpoints corresponding to Traces 1-5 (Flag Checkpoints 110.1-110.5, respectively) contain values 'xxxx', '0110', 'xxxx', and 'xxxx', respectively. The associated Validity bits are 'x', '1', '0', '0' and 'x', respectively. Note that each flag checkpoint in the illustrated example operation is comprised of four single-bit flags, such as a string direction control flag, a carry status flag, a zero status flag, and a parity status flag. Thus Flag Checkpoint 110.1 (corresponding to Trace 1) stores no values and has no validity of importance in the example (i.e. Flag Checkpoint 110.1 is not allocated). Flag Checkpoint 110.2 (corresponding to Trace 2) is valid and stores values of 0, 1, 1, and 0, respectively for the string direction, carry, zero and parity flags. Flag Checkpoints 110.3 and 110.4 are invalid (111.3 and 111.4 are zero) and store no values of importance. The invalid flag checkpoints are allocated but as yet unused (e.g. as a result of "Allocate (Invalid) Checkpoint" 302 of FIG. 3). The valid flag checkpoint has been previously allocated (to invalid) and subsequently recorded into and marked valid (as in "Write Checkpoint, Mark Valid" 304 of FIG. 3).

Execution of "Trace 4 Flag-Producer" 610 (e.g. by Flag Modification logic 103 of FIG. 1) updates Speculative Flags 102 (of FIG. 1) with values '0001', as illustrated conceptually by dashed-arrow Exec 611. However, before any modifications to the Speculative Flags resulting from execution of "Trace 4 Flag-Producer" 610, Validity Bit 111.4 (associated with Flag Checkpoint 110.4 and corresponding to Trace 4) is checked to determine validity (as in "Valid Checkpoint?" 303). Since Validity Bit 111.4 indicates invalid, Flag Checkpoint 110.4 is updated with the Speculative Flags value '1100' (i.e. before any modifications associated with Trace 4), and associated Validity Bit 111.4 is written to '1' (as in "Write Checkpoint, Mark Valid" 304), as illustrated conceptually by Ckpt 613. Note that "Trace 4 Flag-Producer" 610 is representative of one or more updates to the Speculative Flags, and thus on the second (if present and any subsequent) flag modifications associated with Trace 4, Flag Checkpoint 110.4 is left unchanged (i.e. retains '1100'). If Trace 4 is aborted, then the Speculative Flags are restored from Flag Checkpoint 110.4 (corresponding to Trace 4), as illustrated conceptually by dotted-arrow Abort 612 (e.g. as in "Select/Read Checkpoint" 307 and "Conditional Restore Speculative Flags" 308 of FIG. 3).

Atomic Traces

Figure 7:
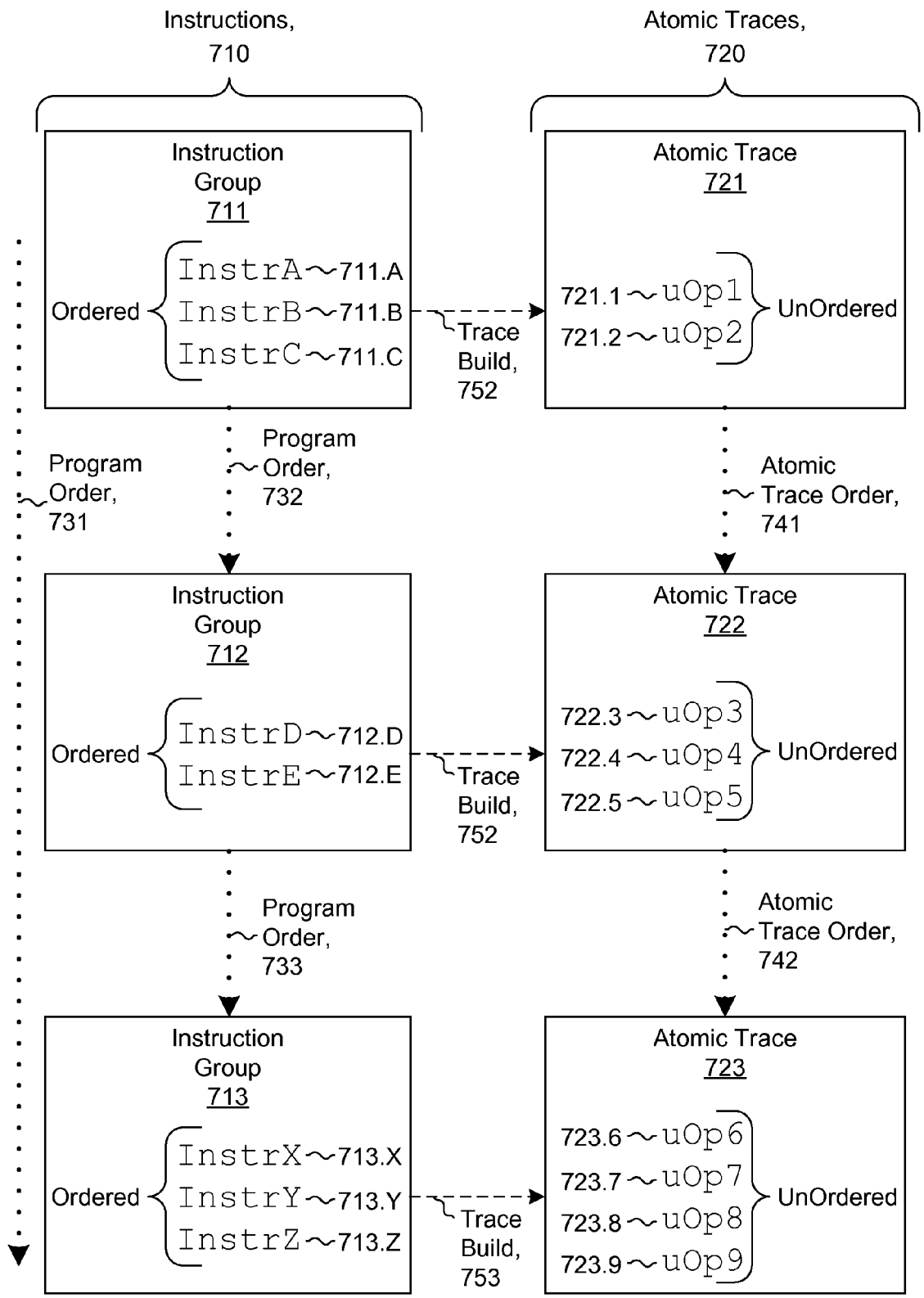
FIG. 7 illustrates selected details of an embodiment of the invention relating to building atomic traces from instruction groups.

FIG. 7 illustrates selected details of an embodiment of building atomic traces from instruction groups. Conceptually Instructions 710 are analyzed and translated into micro-operations in Atomic Traces 720. Instructions 710 are comprised of Instruction Groups 711-713. Within each instruction group the instructions are dynamically consecutive (according to program order), and the instruction groups are dynamically consecutive (according to the program order) with respect to each other, as illustrated conceptually by dashed-arrows Program Order 731-733. Thus the program order of Instructions 710 (from first or oldest to last or youngest) is InstrA 711.A, InstrB 711.B, InstrC 711.C, InstrD 712.D, InstrE 712.E, InstrX 713.X, InstrY 713.Y, and InstrZ 713.Z. Note that if an instruction group has a control flow instruction, then the instructions of the group need not be contiguous. Further note that if the last instruction in an instruction group is a control flow instruction, then the following (according to the program order) instruction group need not be contiguous.

Atomic Traces 720 are comprised of Atomic Traces 721-723. The micro-operations of each atomic trace have no defined program order with respect to each other (e.g. the micro-operations are unordered), although the micro-operations do have a trace order with respect to each other (i.e. the order the micro-operations appear in the trace). However, the atomic traces do have a defined program order with respect to each other (i.e. the atomic traces have a relative program order), illustrated conceptually by dash-arrows Atomic Trace Order 741 and 742. The relative program order of the atomic traces corresponds to the relative program order of the instruction groups corresponding to the atomic traces. For example, Instruction Groups 711 and 712 are in program order with respect to each other, and thus Atomic Traces 721 and 722 are in program order with respect to each other (711/721 are first or oldest, while 712/722 are second or younger).

Atomic traces (optionally having no internal program order) are comprised of micro-operations from one or more instructions from corresponding instruction groups. Some instructions are translated into single micro-operations, and some instructions are translated into two or more micro-operations. Thus according to various usage scenarios and embodiments, an atomic trace comprises the same number or a greater number of micro-operations as the number of instructions in the corresponding instruction group.

More specifically, Instruction Groups 711-713 are developed into corresponding Atomic Traces 721-723, as illustrated conceptually by associated Trace Builds 751-753. Two micro-operations (uOp1 721.1 and uOp2 721.2) are sufficient to implement processing specified by InstrA, InstrB, and InstrC. uOp1 and uOp2 have no defined program order with respect to each other, but uOp2 does follow uOp1 according to trace order. Three micro-operations (uOp3 722.3, uOp4 722.4, and uOp5 722.5) implement processing specified by InstrD and InstrE. uOp3, uOp4, and uOp5 have no defined program order with respect to each other, but are in relative trace order (uOp3 is first and uOp5 is last). uOp3 follows uOp2 according to program order (since Atomic Trace 722 follows Atomic Trace 721 according to program order). Further uOp5 precedes uOp6 723.6 in program order (since Atomic Trace 722 precedes Atomic Trace 723 in program order). Four micro-operations (uOp6 723.6, uOp7 723.7, uOp8 723.8, and uOp9 723.9) implement processing specified by InstrX, InstrY, and InstrZ. uOps 6-9 have no defined program order with respect to each other, but are in relative trace order (uOp6 is first and uOp9 is last).

In various embodiments in accordance with the foregoing first and second techniques, traces are atomic and have relative program order with respect to each other, while lacking a defined program order between micro-operations (or instructions) within the traces, as illustrated in FIG. 7. In various embodiments in accordance with the foregoing first and second techniques, traces are atomic and have relative program order with respect to each other, and further have a defined program order between micro-operations (or instructions) within the traces. In various embodiments in accordance with the foregoing first and second techniques, traces that are not atomic are used in place of atomic traces. In some of the embodiments using non-atomic traces, micro-operations (or instructions) within the traces have no defined program order with respect to each other, while in some others of the embodiments using non-atomic traces, micro-operations (or instructions) within the traces have a defined program order with respect to each other.

In some embodiments in accordance with the first and the second techniques, groups of micro-operations (or instructions) having no specific correspondences to traces or atomic traces are used in place of atomic traces. For example, flags are checkpointed and restored with respect to the groups of micro-operations (instead of with respect to atomic traces). In some of the embodiments using groups of micro-operations (or instructions) having no specific correspondences to traces or atomic traces, micro-operations (or instructions) within the groups have no defined program order with respect to each other, while in some others of the embodiments using groups of micro-operations (or instructions) having no specific correspondences to traces or atomic traces, micro-operations (or instructions) within the groups have a defined program order with respect to each other.

According to various embodiments any combination of traces, atomic traces, and groups of instructions or micro-operations are retained in a cache, such as a trace cache. According to various embodiments any combination of a trace, an atomic trace, and a group of instructions or micro-operations correspond to all or any portion of a basic block of instructions. In some embodiments a basic block trace cache retains entries of traces or atomic traces corresponding to all or any portion of a basic block of instructions. According to various embodiments any combination of a trace, an atomic trace, and a group of instructions or micro-operations correspond to all or any portion of more than one basic block of instructions. In some embodiments a multi-block trace cache retains entries of traces or atomic traces corresponding to all or any portion of one or more basic blocks of instructions.

Speculative Execution Management

According to various embodiments, a variety of mechanisms are used in various combinations to efficiently manage speculative execution. Retention of speculative state with reduced physical register file area is enabled by shadow registers. A special register renaming scheme enables zero-cycle register clear operations. Various mechanisms collect misprediction and exception information during processing of atomic traces, and determine a response. If appropriate, an atomic trace is aborted, and the atomic trace is re-fetched and re-executed, optionally with additional or different constraints or formation. If appropriate, an atomic trace is aborted, and a different or altered atomic trace is fetched and executed.

In some embodiments, speculative processing comprises retaining speculative state until retirement (or commit) of speculated actions. A register file implements more physical registers than architected registers (such as general purpose or floating point registers) in part to retain portions of the speculative state relating to the architected registers. Out-of-order instruction processing is enabled in part by register renaming, and mappings are maintained between the physical and the architected registers. If the physical register file provides a relatively large number of read ports and/or write ports, then relatively more area is used than if relatively fewer read/write resources are provided, since writing to/from the ports, in some embodiments, dominates area and speed.

In some embodiments, allocation and deallocation of shadow registers used by atomic traces provides efficient speculative state management in a processor supporting a plurality of outstanding traces. A register file comprises physical registers mapped to logical registers associated with the architected registers. Each of the physical registers has an associated set of shadow registers (for example two shadow registers). The shadow registers store copies of physical register values that are used to roll back state when an atomic trace is aborted. The shadow registers have relatively fewer ports than the physical registers. Physical register allocation is a function of whether an associated shadow register is free. Shadow registers are deallocated when no longer required after an atomic trace is completed either normally or with an abort. In some embodiments physical registers are freed early, in part enabled by the shadow registers. A rename table records mappings between logical, physical, and shadow registers. A mapping checkpoint table records snapshots of the mappings (when a trace begins) that are used during abort processing. See U.S. Provisional Application Ser. No. 60/730,810, filed Oct. 27, 2005, first named inventor John Gregory Favor, and entitled ALLOCATION AND DEALLOCATION OF SHADOW REGISTERS USED BY ATOMIC TRACES; hereby incorporated by reference for all purposes, and U.S. Provisional Application Ser. No. 60/863,125, Oct. 26, 2006, first named inventor Christopher P. Nelson, and entitled METHOD FOR EARLY DEALLOCATION OF PHYSICAL REGISTERS WHEN SHADOW REGISTERS ARE USED; hereby incorporated by reference for all purposes, for more detailed descriptions.

In some embodiments, a register clear operation specifying a logical destination register is processed by a register renaming scheme that maps the destination register to a particular physical register. Other operations specifying a logical destination register are processed by a read/write register renaming scheme that maps the respective logical destination registers to one of a plurality of read/write physical registers. A physical register file implements the particular and read/write physical registers. The particular physical register is unaffected by writes and always returns zero when read. Thus the clear operation is performed in zero execution cycles. According to various usage scenarios, software uses the clear operation explicitly or implicitly via an instruction translation mechanism. Software optionally invokes the clear operation when transitioning to a mode having a reduced number of logical registers to free a portion of the physical registers that would otherwise remain allocated to unavailable logical registers. See U.S. Provisional Application Ser. No. 60/732,438, filed Nov. 1, 2005, first named inventor John Gregory Favor, and entitled ZERO-CYCLE EXECUTION OF CLEAR OPERATION AND AUTOMATIC REGISTER FREE; hereby incorporated by reference for all purposes, for a more detailed description.

In some embodiments, various predictive mechanisms to assume instruction execution control flow (such as branch direction prediction and lack of exceptions), to assume instruction execution values (such as load values and flag values), or both are used to reduce instruction processing latency. Embodiments using the predictive mechanisms are enabled to recognize when one or more of the assumptions are incorrect and to then correct pipeline flow accordingly.

In some embodiments, a pipelined processor implements speculative execution according to sequences of atomic traces. A highest priority abort trigger is determined for traces generating one or more abort triggers when executed. The highest priority abort trigger is determined according to embodiment-dependent pipeline behaviors and capabilities. The highest priority abort trigger is also determined according to priority dependent on original program order associated with instructions that are compatible with a specific instruction set architecture, and according to architectural exception priorities defined by the specific instruction set architecture. A variety of mechanisms are employed to accumulate a plurality of pending abort triggers for a trace. The triggers are prioritized as recognized, and responded to in a single abort event, or a plurality of abort events, according to usage scenario and embodiment. The response includes altering assumptions, constraints, predictions, mode of processing, and any combination thereof associated with the original trace to execute a new trace intended to make forward progress. See U.S. Provisional Application Ser. No. 60/731,962, filed Oct. 31, 2005, first named inventor John Gregory Favor, and entitled DETERMINING THE HIGHEST PRIORITY ABORT TRIGGER IN AN ATOMIC TRACE; hereby incorporated by reference for all purposes, and U.S. Provisional Application Ser. No. 60/862,609, filed Oct. 24, 2006, first named inventor Christopher P. Nelson, and entitled EXCEPTION HANDLING FOR ATOMIC TRACES; hereby incorporated by reference for all purposes, for more detailed descriptions.

Trace Cache

In some embodiments, various mechanisms are used to improve processing of actions (e.g. instructions, operations, or micro-operations). In some embodiments separate caches for instructions, basic blocks, and traces are provided to improve delivery of actions (e.g. micro-operations) to execution units for processing (e.g. execution). A unified sequencer selects actions to perform (e.g. micro-operations to execute) from among the caches, and also determines subsequent actions to perform. See U.S. Provisional Application Ser. No. 60/832,848, Jul. 23, 2006, first named inventor Don Alpert, and entitled MICROPROCESSOR WITH CACHES FOR INSTRUCTIONS, BASIC BLOCKS, AND TRACES; hereby incorporated by reference for all purposes, and U.S. Provisional Application Ser. No. 60/832,822, Jul. 23, 2006, first named inventor Don Alpert, and entitled MICROPROCESSOR WITH COHERENT CACHES FOR BASIC BLOCKS AND TRACES, hereby incorporated by reference for all purposes, for more detailed descriptions.

CONCLUSION

Although the foregoing embodiments have been described in some detail for purposes of clarity of description and understanding, the invention is not limited to the details provided. There are many embodiments of the invention. The disclosed embodiments are exemplary and not restrictive.

It will be understood that many variations in construction, arrangement, and use are possible consistent with the description and are within the scope of the claims of the issued patent. For example, interconnect and function-unit bit-widths, clock speeds, and the type of technology used are variable according to various embodiments in each component block. Names given to interconnect and logic are merely descriptive, and should not be construed as limiting the concepts described. The order and arrangement of flowchart and flow diagram process, action, and function elements is variable according to various embodiments. Also, unless specifically stated to the contrary, value ranges specified, maximum and minimum values used, or other particular specifications, are merely those of the described embodiments, are expected to track improvements and changes in implementation technology, and should not be construed as limitations.

Functionally equivalent techniques known in the art are employable instead of those described to embody various components, sub-systems, functions, operations, routines, and sub-routines. It is also understood that many functional aspects of embodiments are realizable selectively in either hardware (i.e., generally dedicated circuitry) or computer readable storage medium wherein software (i.e., via some manner of programmed controller or processor) is stored, as a function of embodiment dependent design constraints and technology trends of faster processing (facilitating migration of functions previously in hardware into software stored in the computer readable storage medium) and higher integration density (facilitating migration of functions previously in software, stored in the computer readable storage medium into hardware). Specific variations in various embodiments include, but are not limited to: differences in partitioning; different form factors and configurations; use of different operating systems and other system software; use of different interface standards; number and type of flag checkpoint entries; number, width, and organization of fields in flag checkpoint tables; number of entries or stages in registers and buffers; and other variations to be expected when implementing the concepts described herein in accordance with the unique engineering and business constraints of a particular application.

The embodiments have been described with detail and environmental context well beyond that required for a minimal implementation of many aspects of the embodiments described. Those of ordinary skill in the art will recognize that some embodiments omit disclosed components or elements without altering basic cooperation among the remaining elements. It is thus understood that much of the details described are not required to implement various aspects of the embodiments described. To the extent that the remaining elements are distinguishable from the prior art, components and features that are omitted are not limiting on the embodiments described herein.

All such variations in embodiments comprise insubstantial changes over the teachings conveyed by the described embodiments. It is also understood that the embodiments described herein have broad applicability to other computing applications, and are not limited to the particular application or industry of the described embodiments. The invention is thus to be construed as including all possible modifications and variations encompassed within the scope of the claims of the issued patent.

The invention claimed is:

1. A method comprising:
   managing groups of actions associated with instructions as atomic elements that are either committed entirely according to a program order or aborted entirely;
   managing a correspondence between the groups of actions and corresponding saved copies of speculative flags;
   selectively restoring, in response to aborting one of the groups of actions, the speculative flags as a function of the saved copy of the speculative flags corresponding to the aborted group of actions;
   saving a respective one of the saved copies of the speculative flags corresponding to each group of actions; and
   updating the saved copy of the speculative flags corresponding to the aborted group of actions in response to a flag result produced by performing one or more of the groups of actions older, according to the program order than the aborted group of actions,
   wherein the managing the groups of actions, the managing the correspondence, and the selectively restoring occur as part of processing the groups of actions by a processor implemented within an integrated circuit and compatible with execution of the instructions.

2. The method of claim 1, wherein the actions comprise micro-operations produced from the instructions.

3. The method of claim 1, wherein the saving is before any modification of the speculative flags in association with performing any flag-producing ones of the actions of the respective group of actions.

4. The method of claim 1, wherein the selectively restoring unconditionally sets the speculative flags based on the saved copy of the speculative flags corresponding to the aborted group of actions.

5. The method of claim 1, wherein the managing comprises allocating the saved copies to an invalid state.

6. A method comprising
   managing groups of actions associated with instructions as atomic elements that are either committed entirely according to a program order or aborted entirely;
   managing a correspondence between the groups of actions and corresponding saved copies of speculative flags, wherein the managing comprises allocating the saved copies to an invalid state;
   selectively restoring, in response to aborting one of the groups of actions, the speculative flags as a function of the saved copy of the speculative flags corresponding to the aborted group of actions; and
   if performing any of the actions of the aborted group of actions produces one or more changes to the speculative flags, then saving values of the speculative flags before the changes as the saved copy of the speculative flags corresponding to the aborted group of actions, and setting the saved copy of the speculative flags corresponding to the aborted group of actions to a valid state,
   wherein the managing the groups of actions, the managing the correspondence, and the selectively restoring occur as part of processing the groups of actions by a processor implemented within an integrated circuit and compatible with execution of the instructions.

7. The method of claim 6, wherein the selectively restoring comprises restoring the speculative flags based on searching for a first valid one of the saved copies of the speculative flags starting with the saved copy of the speculative flags corresponding to the aborted group of actions and proceeding to the saved copy of the speculative flags corresponding to the group of actions that is the next younger of the groups of actions than the aborted group of actions according to the program order.

8. A processor comprising:
speculative execution control logic enabled to commit and to abort groups of actions associated with instructions as respective atomic elements in accordance with a program order between the groups of actions;
flag checkpoint managing logic enabled to manage correspondences between the groups of actions and corresponding saved copies of speculative flags;
flag restoring logic enabled, in response to an abort of one of the groups of actions, to selectively restore the speculative flags as a function of the saved copy of the speculative flags corresponding to the aborted group of actions; and
flag checkpointing logic enabled to save a respective one of the saved copies of the speculative flags corresponding to each group of actions, wherein the flag checkpointing logic is further enabled, in response to a flag result produced by executing one or more of the groups of actions older than the aborted group of actions, to update the saved copy of the speculative flags corresponding to the aborted group of actions.

9. The processor of claim 8, further comprising a micro-operation build logic unit enabled to produce the actions as micro-operations built from the instructions.

10. The processor of claim 8, wherein the flag checkpointing logic is further enabled to perform the save before any modification of the speculative flags associated with performing any flag-producing ones of the actions of the respective group of actions.

11. The processor of claim 8, wherein the flag restoring logic is further enabled to perform the selective restoring by unconditionally setting the speculative flags based on the saved copy of the speculative flags corresponding to the aborted group of actions.

12. The processor of claim 8, flag checkpoint allocating logic enabled to allocate the saved copies to an invalid state.

13. A processor comprising
speculative execution control logic enabled to commit and to abort groups of actions associated with instructions as respective atomic elements in accordance with a program order between the groups of actions;
flag checkpoint managing logic enabled to manage correspondences between the groups of actions and corresponding saved copies of speculative flags; and
flag restoring logic enabled, in response to an abort of one of the groups of actions, to selectively restore the speculative flags as a function of the saved copy of the speculative flags corresponding to the aborted group of actions;
flag checkpoint allocating logic enabled to allocate the saved copies to an invalid state; and
flag checkpointing logic enabled, if performing any of the actions of the aborted group of actions produces one or more changes to the speculative flags, to save values of the speculative flags before the changes as the saved copy of the speculative flags corresponding to the aborted group of actions, and to set the saved copy of the speculative flags corresponding to the aborted group of actions to a valid state.

14. The processor of claim 13, wherein the flag restoring logic is further enabled to direct the selective restoring to restore the speculative flags based on searching for a first valid one of the saved copies of the speculative flags starting with the saved copy of the speculative flags corresponding to the aborted group of actions and proceeding to the saved copy of the speculative flags corresponding to the group of actions that is the next younger of the groups of actions than the aborted group of actions according to the program order.

15. A medium readable by a computer system that contains descriptions that specify, when interpreted by the computer system, a circuit comprising:
a speculative execution control sub-circuit enabled to direct committing and aborting groups of actions associated with instructions as respective atomic elements in accordance with a program order between the groups of actions;
a flag checkpoint managing sub-circuit enabled to manage correspondences between the groups of actions and corresponding saved copies of speculative flags;
a flag restoring sub-circuit enabled, in response to an abort of one of the groups of actions, to selectively restore the speculative flags as a function of the saved copy of the speculative flags corresponding to the aborted group of actions; and
a flag checkpointing sub-circuit enabled to save a respective one of the saved copies of the speculative flags corresponding to each of the groups of actions before any modification of the speculative flags associated with performing any flag-producing ones of the actions of the respective group of actions, and further enabled, in response to a flag result produced by executing one or more of the groups of actions older than the aborted group of actions, to update the saved copy of the speculative flags corresponding to the aborted group of actions.

16. The medium of claim 15, wherein the flag restoring sub-circuit is further enabled to perform the selective restoring by setting the speculative flags based on the saved copy of the speculative flags corresponding to the aborted group of actions.

17. The medium of claim 15, wherein the circuit further comprises a flag checkpoint allocating sub-circuit enabled to allocate the saved copies to an invalid state.

18. A medium readable by a computer system that contains descriptions that specify, when interpreted by the computer system, a circuit comprising:
a speculative execution control sub-circuit enabled to direct committing and aborting groups of actions associated with instructions as respective atomic elements in accordance with a program order between the groups of actions;
a flag checkpoint managing sub-circuit enabled to manage correspondences between the groups of actions and corresponding saved copies of speculative flags;
a flag restoring sub-circuit enabled, in response to an abort of one of the groups of actions, to selectively restore the speculative flags as a function of the saved copy of the speculative flags corresponding to the aborted group of actions; and
a flag checkpoint saving sub-circuit enabled, if execution of any of the actions of the aborted group of actions produces one or more changes to the speculative flags, to save values of the speculative flags before the changes as the saved copy of the speculative flags corresponding to the aborted group of actions, and to set the saved copy of the speculative flags corresponding to the aborted group of actions to a valid state.

19. The medium of claim 18, wherein the flag restoring sub-circuit is further enabled to perform the selective restoring by setting the speculative flags based on searching for a first valid one of the saved copies of the speculative flags starting with the saved copy of the speculative flags corresponding to the aborted group of actions and proceeding to the saved copy of the speculative flags corresponding to the group of actions that is the next younger of the groups of actions than the aborted group of actions according to the program order.

\* \* \* \* \*